(12) United States Patent
Futatsumori

(10) Patent No.: US 10,346,113 B2
(45) Date of Patent: Jul. 9, 2019

(54) PRINTING APPARATUS WHICH NOTIFIES A USER THAT A PREDETERMINED ATTRIBUTE OF A SHEET SET IN THE PRINTING APPARATUS AND THE PREDETERMINED ATTRIBUTE SET AS A PRINT SETTING DO NOT MATCH, AND METHOD FOR CONTROLLING THE PRINTING APPARATUS

(71) Applicant: CANON KABUSHIKI KAISHA, Tokyo (JP)

(72) Inventor: Yuki Futatsumori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/000,267

(22) Filed: Jun. 5, 2018

(65) Prior Publication Data

US 2018/0364961 A1 Dec. 20, 2018

(30) Foreign Application Priority Data

Jun. 16, 2017 (JP) .................. 2017-119066

(51) Int. Cl.
*G06F 15/00* (2006.01)
*G06F 3/12* (2006.01)
*G06K 1/00* (2006.01)
*H04N 1/00* (2006.01)
*G09G 3/06* (2006.01)

(52) U.S. Cl.
CPC .......... *G06F 3/1259* (2013.01); *G06F 3/1205* (2013.01); *G06F 3/1207* (2013.01); *G06F 3/1252* (2013.01); *G06F 3/1255* (2013.01); *H04N 1/0049* (2013.01); *G09G 3/06* (2013.01)

(58) Field of Classification Search
CPC .... G06F 3/1259; G06F 3/1207; G06F 3/1252; H04N 1/0049; G09G 3/06
USPC ............................. 358/1.13, 1.15, 1.14, 1.1
See application file for complete search history.

(56) References Cited

U.S. PATENT DOCUMENTS

2012/0141179 A1* 6/2012 Atsumi .............. G03G 15/6567
399/381
2015/0097027 A1* 4/2015 Jacomet ............. G07D 11/0036
235/375

FOREIGN PATENT DOCUMENTS

JP 2007203703 A 8/2007

\* cited by examiner

*Primary Examiner* — Douglas Q Tran
(74) *Attorney, Agent, or Firm* — Canon U.S.A., Inc. IP Division

(57) ABSTRACT

A printing apparatus includes first and second acquisition units. First sheet information related to a predetermined sheet attribute set in the printing apparatus and second sheet information related to the predetermined sheet attribute set as a print setting is acquired. Where first and second sheet information do not match, the display unit displays a first part of notification information for notifying a user that they do not match and a predetermined display item of a first display item related to the first sheet information and a second display item related to the second sheet information. Even when no user instruction is given where the first part and the predetermined display item are displayed, a second part of the notification information and an other display item of the first display item and the second display item are displayed instead of the first part and the predetermined display item.

20 Claims, 5 Drawing Sheets

PRINTING APPARATUS WHICH NOTIFIES A USER THAT A PREDETERMINED ATTRIBUTE OF A SHEET SET IN THE PRINTING APPARATUS AND THE PREDETERMINED ATTRIBUTE SET AS A PRINT SETTING DO NOT MATCH, AND METHOD FOR CONTROLLING THE PRINTING APPARATUS

BACKGROUND OF THE INVENTION

Field of the Invention

The present disclosure relates to a printing apparatus for printing images, and a method for controlling the printing apparatus.

Description of the Related Art

There is a technique for determining whether a sheet size set as a print setting in a print job matches a sheet size set in a printing apparatus. Japanese Patent Laid-Open No. 2007-203703 discloses a printing apparatus including a sensor for detecting sheet size and a technique for detecting a mismatch between sheet sizes by comparing the sheet size with a sheet size set for a print job, and when a mismatch is detected, notifying the user of the mismatch.

However, the amount of information that can be displayed may be limited, depending on the display unit. In the case where such a display unit is used for display using the technique disclosed in Japanese Patent Laid-Open No. 2007-203703, sufficient information may not be notified to the user.

SUMMARY OF THE INVENTION

The present disclosure provides a technique for properly notifying the user of a mismatch in sheet information, even for a display unit that displays limited information. For example, even if no user instruction is given when part of notification information for notifying a user that sheet information do not match is displayed, another part of the notification information is displayed.

According to an aspect of the present invention, a printing apparatus for printing an image includes a first acquisition unit configured to acquire first sheet information related to a predetermined attribute of a sheet set in the printing apparatus, a second acquisition unit configured to acquire second sheet information related to the predetermined attribute set as a print setting for printing executed by the printing apparatus, and a display control unit configured to cause a display unit to display notification information, wherein, in a case where the first sheet information and the second sheet information do not match, the display control unit causes the display unit to display notification information for notifying a user that the first sheet information acquired by the first acquisition unit and the second sheet information acquired by the second acquisition unit do not match, wherein the notification information is for notifying the user of a first display item related to the first sheet information and a second display item related to the second sheet information, wherein, when displaying the notification information, the display control unit causes the display unit to display a first part of the notification information and a predetermined display item of the first display item and the second display item, and wherein, even in a case where no user instruction is given in a case where the first part and the predetermined display item are displayed, the display control unit causes the display unit to display a second part of the notification information different from the first part and display another display item of the first display item and the second display item instead of the first part and the predetermined display item.

Further features of the present invention will become apparent from the following description of embodiments with reference to the attached drawings.

DESCRIPTION OF THE EMBODIMENTS

Figure 1:
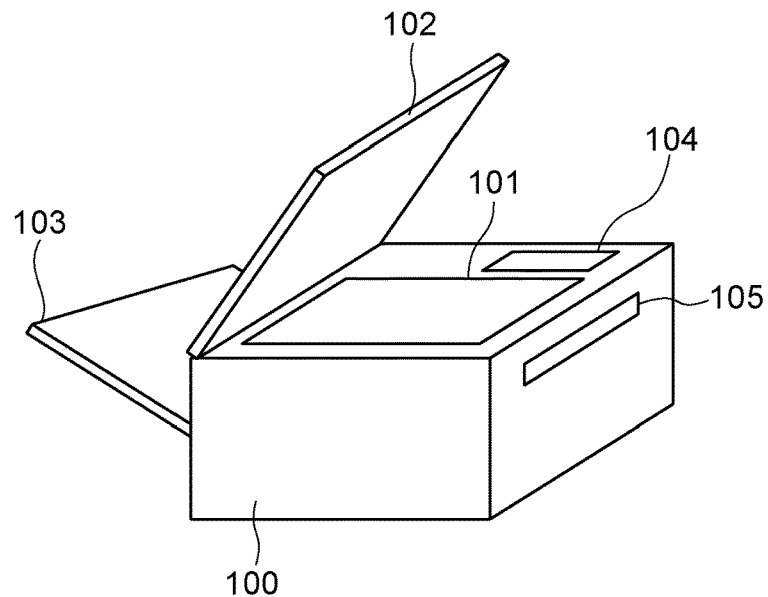
FIG. 1 is a diagram illustrating the appearance of a printing apparatus according to an embodiment.

FIG. 1 is a diagram illustrating the appearance of a printing apparatus according to an embodiment. In the present embodiment, a printing apparatus 100, which is a multi-function printing unit (MFP) having a reading function (a scanner), will be described by way of example. In FIG. 1, a platen glass 101 is a transparent glass table, on which an original to be read by a scanner is placed. An original cover 102 is a cover for preventing light from escaping to the exterior when the original is read by the scanner. A feeding unit 103 is an insertion opening through which various sizes of sheets can be set. The sheets set in the feeding unit 103 are conveyed to a printing unit one by one, and after images are printed, the sheets are discharged from a sheet output tray 105. An operation panel 104 is used for the user to input setting values and execute processes and is disposed on an outer surface of the printing apparatus 100. The feeding unit 103 may be an automatic document feeder (ADF), as illustrated in FIG. 1, or a sheet cassette that can be opened and closed by the user.

Figure 2:
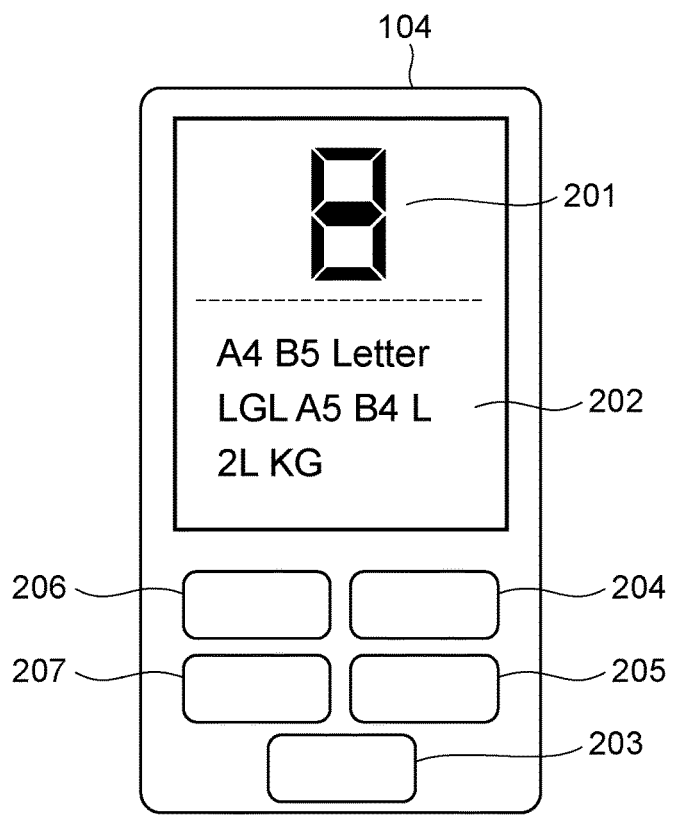
FIG. 2 is an enlarged front view of an operation panel of the printing apparatus of the present embodiment.

FIG. 2 is an enlarged front view of the operation panel 104 of the printing apparatus 100 of the present embodiment. As illustrated in FIG. 2, the operation panel 104 separately includes a seven-segment, display 201 and a sheet size display 202. The seven-segment display 201 includes seven segments that can be lit and can represent numerals 0 to 9 and alphabets with a combination of lit segments. The operation panel 104 further includes an operating unit: a power button 203, a start button 204, a stop button 205, a sheet button 206, and an enter button 207.

When the power button 203 is pressed, the power of the printing apparatus 100 is turned on or off. When the start button 204 is pressed, an operation of the printing apparatus (copying or printing) is started. When the start button 204 is continuously pressed, the number of copies is changed. The number of copies is displayed on the seven-segment display 201 according to the change in number. When the stop button 205 is pressed, the operation of the printing apparatus 100 is stopped. When the sheet button 206 is pressed, the sheet setting of the printing apparatus 100 can be changed, and the setting is confirmed by pressing the enter button 207. The confirmed sheet size is displayed on the sheet size display 202.

Figure 3:
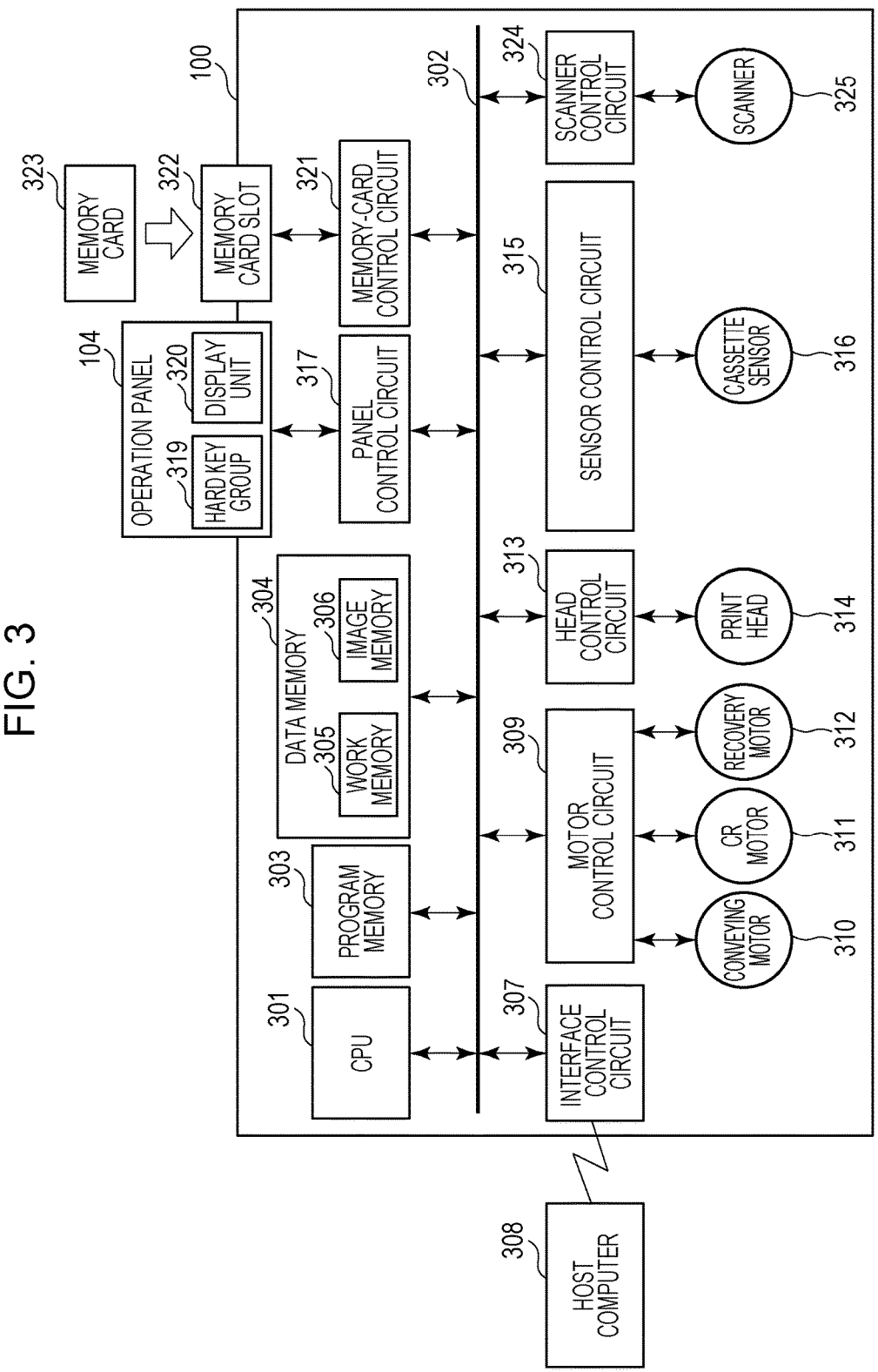
FIG. 3 is a block diagram illustrating the configuration of the printing apparatus of the present embodiment.

FIG. 3 is a block diagram illustrating the configuration of the printing apparatus 100 of the present embodiment, illustrating the configuration of the control system of the printing apparatus 100. A CPU 301 in the form of a microprocessor operates by executing a control program read from a program memory 303 (non-volatile memory) in the form of a read-only memory (ROM), which is connected through an internal bus 302, in a data memory 304 in the form of a random-access memory (RAM). The data memory 304 is used as a work memory 305 that the CPU 301 uses in executing the above control program and an image memory 306 in which image data to be formed on a recording sheet. The CPU 301 controls an interface control circuit 307 to receive print job data from a host computer 308 connected via an external interface or notify the host computer 308 of the status of the printing apparatus 100. The CPU 301 can control various motors for driving the mechanisms of the printing apparatus 100 via a motor control circuit 309. A conveying motor 310 drives a sheet feed roller, a conveying roller, and a discharge roller to convey recording sheets from the feeding unit 103 to the sheet output tray 105. A carriage motor 311 (a CR motor in the drawing) drives a carriage back and forth. A recovery motor 312 drives a head recovery mechanism in synchronism with the driving of the carriage to execute a recovery operation for properly maintaining the state of a print head 314. The CPU 301 can control the print head 314 via a head control circuit 313. The CPU 301 controls the print head 314 in synchronism with the reciprocating motion of the carriage to print an image on the recording sheet. A cassette sensor 316 for the feeding unit 103 includes a photo interrupter and a mechanical switch. When the cassette sensor 316 detects that the user sets or removes a sheet to or from the feeding unit 103 of the printing apparatus 100, the CPU 301 can obtain the detection result via the sensor control circuit 315. The cassette sensor 316 is disposed at an ADF, for example, the feeding unit 103 illustrated in FIG. 1, and detects that sheets are set in the ADF. In the case where the feeding unit 103 is an openable sheet cassette, the cassette sensor 316 may detect that the sheet cassette is opened or closed, and the CPU 301 may obtain the detection result.

The CPU 301 controls the operation panel 104 disposed on the outer surface of the printing apparatus 100 via a panel control circuit 317. Specifically, the CPU 301 can display desired information on a display unit 320 disposed on the operation panel 104 or monitor an operation (instruction) from the user to a hard key group 319 on the operation panel 104. The operation panel 104 illustrated in FIG. 3 corresponds to the operation panel 104 described with reference to FIG. 2. The hard key group 319 includes the buttons 203 to 207 illustrated in FIG. 2. The display unit 320 includes the seven-segment display 201 and the sheet size display 202 illustrated in FIG. 2.

The CPU 301 can control a scanner 325 (not illustrated in FIG. 1) via the scanner control circuit 324 to read an original placed on the platen glass 101. The CPU 301 can access a memory card 323 inserted in a memory card slot 322 provided on the outer surface of the printing apparatus 100 via a memory-card control circuit 321. The CPU 301 can read and write various files from or into the memory card 323. The scanned image read by the scanner 325 is stored in the image memory 306 in the data memory 304. The CPU 301 can transmit the scanned image stored in the image memory 306 to the host computer 308 or store the scanned image in the memory card 323 as an image file according a user instruction. The CPU 301 can also execute a copying function by controlling a printing mechanism to print a scanned image read by the scanner 325.

Figure 4A:
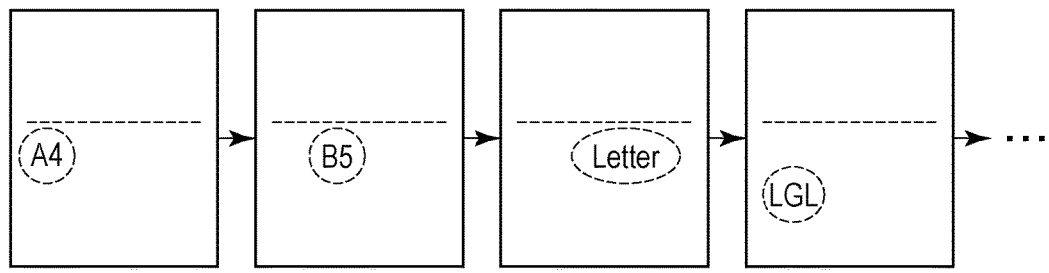
FIG. 4A is a diagram illustrating an example of a screen display for setting sheet information in the present embodiment.
Figure 4B:
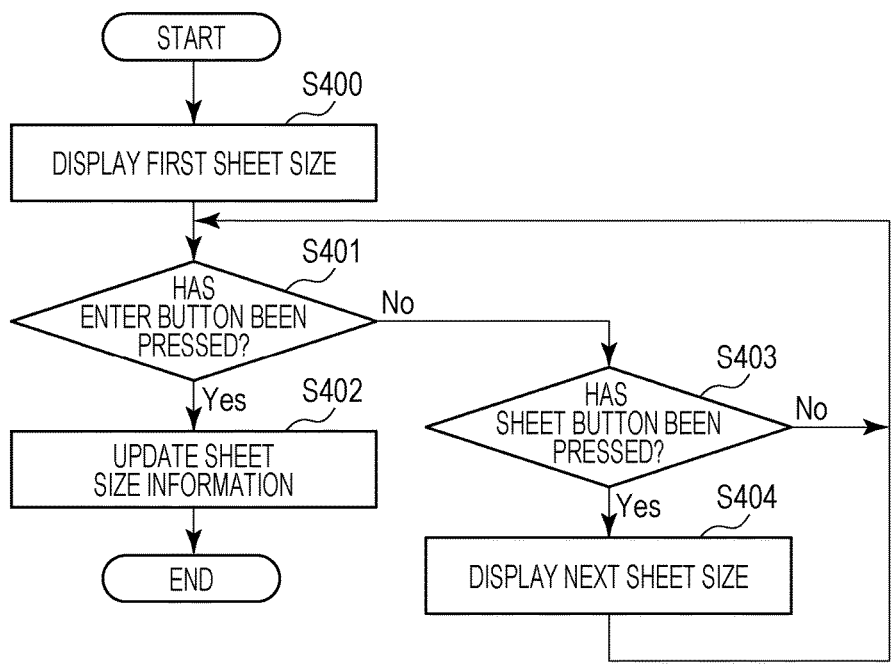
FIG. 4B is a diagram illustrating an example of a sheet-information setting process.

FIG. 4A is a diagram illustrating an example of a screen display for setting sheet information in the present embodiment, and FIG. 4B is a diagram illustrating an example of a sheet-information setting process. The sheet information setting is a process for setting (registering) sheet information related to a predetermined attribute of the sheet according to a user instruction. Here, sheet size will be described as an example of the predetermined attribute. The display illustrated in FIG. 4A is started when the cassette sensor 316 detects insertion of a sheet into the feeding unit 103 or when the sheet button 206 is pressed. The cassette sensor 316 may detect a predetermined operation on the sheet cassette—opening and closing of the sheet cassette. When the sheet cassette is opened or closed, the display illustrated in FIG. 4A may be started. In the case where the user sets (registers) a sheet size when the sheet cassette is opened, the user can set (register) the size of sheets to be set.

The CPU 301 of the printing apparatus 100 executes the feeding unit detecting process, for example, in a cycle of 300 milliseconds (ms), using a cycle hander of a real-time OS in the program memory 303. The cycle of the feeding unit detecting process is determined in advance, for which a time sufficient to execute control for setting sheets in the feeding unit 103 is set. When insertion of sheets is detected by the cassette sensor 316, the detection is notified to a panel task to be executed by the CPU 301 for controlling the operation panel 104. Alternatively, when opening or closing of the sheet cassette is detected by the cassette sensor 316, the detection is notified to the panel task. In the case of an apparatus including a plurality of feeding units, the process is performed for each feeding unit, and detection of insertion of sheets into different feeding units is individually performed.

When insertion of sheets (or opening and closing of the sheet cassette) or pressing of the sheet button 206 is detected, the display of the printing apparatus 100 indicates that sheet information is being set, as illustrated at the left end in FIG. 4A. In this display, the CPU 301 receives an input according to a user operation on the hard key group 319. When the user switches between sheet sizes displayed on the screen by operation on the hard key group 319 and determines a sheet size, the CPU 301 inputs the determined sheet size as the size of sheets set in the feeding unit 103.

FIG. 4A illustrates an example of a screen display for setting sheet information. The broken line circles in FIG. 4A (in FIG. 4A, sheet size, such as "A4") indicate that the icons are blinking. When the icon indicating the sheet size displayed on the sheet size display 202 blinks, and every time the sheet button 206 is pressed, the icon displayed changes in a predetermined order. By pressing the sheet button 206 when the last icon (in FIG. 4A, "LGL") is displayed, the display returns to the first icon (in FIG. 4A, "A4").

FIG. 4B is a flowchart for the sheet-information setting process. The process illustrated in FIG. 4B is started when the cassette sensor 316 detects insertion of sheets in the feeding unit 103 or when the sheet button 206 is pressed. In the case where the feeding unit 103 is a sheet cassette, the process illustrated in FIG. 4B is started when the cassette sensor 316 detects that the sheet cassette is opened or closed.

A program for the process in FIG. 4B is stored in the program memory 303. The processes illustrated in FIG. 4B are implemented by the CPU 301 reading the program into the work memory 305 and executing the program in the work memory 305.

The non-volatile memory, such as the program memory 303, of the printing apparatus 100 has a storage area in which the sheet size of sheets set in the printing apparatus 100 is stored. The CPU 301 updates the size of the sheets set in the printing apparatus 100 by writing size information indicating the sheet size in the storage area.

The above non-volatile memory, such as the program memory 303, stores information indicating a plurality of candidates of sheet size selectable in setting a sheet size and the order in which the plurality of candidates are displayed. For example, a sheet size list is stored in the non-volatile memory.

At S400, the CPU 301 causes the display unit 320 to display the first sheet size of the plurality of candidates of sheet size described above. At S401, the CPU 301 determines whether the enter button 207 has been pressed. If at S401 it is determined that the enter button 207 has been pressed, the process goes to S402. At S402, the CPU 301 sets a sheet size corresponding to the sheet icon displayed at that time as a sheet setting for the feeding unit 103. Specifically, the CPU 301 overwrites size information indicating the displayed sheet size to the above storage area. The CPU 301 terminates the process illustrated in FIG. 4B and returns the display on the display unit 320 from the display illustrated in FIG. 4A to a display before the sheet setting state (before the process illustrated in FIG. 4B is started).

If at S401 it is determined that the enter button 207 is not pressed, then at S403 the CPU 301 determines whether the sheet button 206 has been pressed. If it is determined that the sheet button 206 has been pressed, the process goes to S404. At S404, the CPU 301 changes the displayed sheet size to the next sheet size according to the order of sheet size described above and displays the changed sheet size on the display unit 320. If the process at S404 is executed or if at S403 it is determined that the sheet button 206 is not pressed, the process returns to S401.

Figure 7:
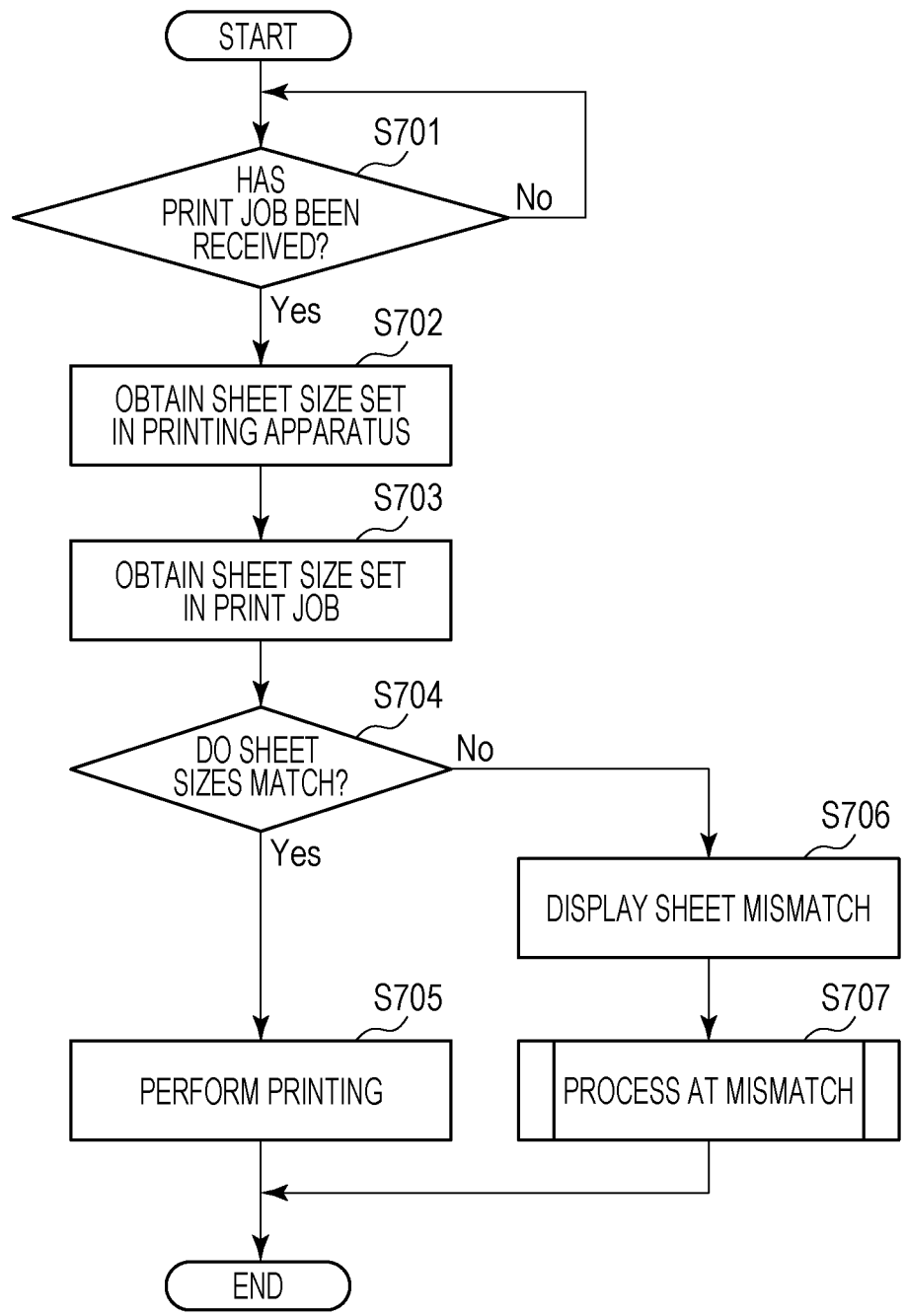
FIG. 7 is a flowchart for a sheet-size determination process in the present embodiment.

FIG. 7 is a flowchart for the sheet-size determination process in the present embodiment. A program corresponding to the process illustrated in FIG. 7 is stored in the program memory 303. The process illustrated in FIG. 7 is implemented by the CPU 301 reading the program into the work memory 305 and executing the program in the work memory 305.

At S701, the CPU 301 determines whether a print job has been received from the host computer 308 via the interface control circuit 307. At S701, it may also be determined whether an instruction to print an image stored in the memory card 323 (card direct printing) or an instruction to perform copying using the scanner 325 has been given, in addition to the determination whether a print job has been received. If at S701 it is determined that a print job has been received (or if an instruction for card direct printing or copying has been given), the process goes to S702.

At S702, the CPU 301 obtains the sheet size updated and stored in the above storage area at S402 in FIG. 4B as the size of sheets set in the printing apparatus 100. That is, the sheet size that the user selected on the screen illustrated in FIG. 4A is obtained as the size of sheets set in the printing apparatus 100.

At S703, the CPU 301 obtains a sheet size (a set sheet size) set in print settings included in the print job received from the host computer 308. The print job is received as a file containing, for example, print data and print setting information indicating print settings. The CPU 301 obtains the set sheet size by referring to the print setting information in the file. If at S701 it is determined that an instruction to perform card direct printing or copying is given, a sheet size selected by the user from the operation panel 104 is obtained as a set sheet size.

At S704, the CPU 301 performs a matching process for determining whether the sheet size obtained at S702 and the sheet size obtained at S703 match. If at S704 it is determined that the above two sheet sizes match, the process goes to S705. At S705, the CPU 301 causes the printing unit of the printing apparatus 100 to print data to be printed (print data). At S705, the CPU 301 creates a print image of a size corresponding to the set sheet size based on the print data and causes the printing unit to print the image. When the size of sheets that are actually set in the printing apparatus 100 is selected by the user by the process illustrated in FIG. 4B, the size of the sheets and the size of the print image match. This allows proper printing.

Even if the sheet size obtained at S702 and the sheet size obtained at S703 do not match, the process may go to S705. For example, even if the two sheet sizes do not match, the process may go to S705 when the difference between the sheet sizes is small. For example, when a combination of sheet sizes with small difference is set in advance in the printing apparatus 100, and the two sheet sizes match, or when the combination of the two sheet sizes corresponds to a preset combination, the process may go to S705. That is, it is determined at S704 whether the sheet size obtained at S702 and the sheet size obtained at S703 match.

If at S704 it is determined that the two sheet sizes do not match, the process goes to S706. If the two sheet sizes do not match, the user may have mistakenly selected the sheet size in the print setting for the print job. There is another possibility that the user has selected a desired sheet size as a print setting for the print job, but sheets of a different size are set in the printing apparatus 100. To prevent undesired printing, at S706 the CPU 301 causes the display unit 320 to execute display indicating that the sheet sizes do not match by controlling the display of the display unit 320.

Figure 5:
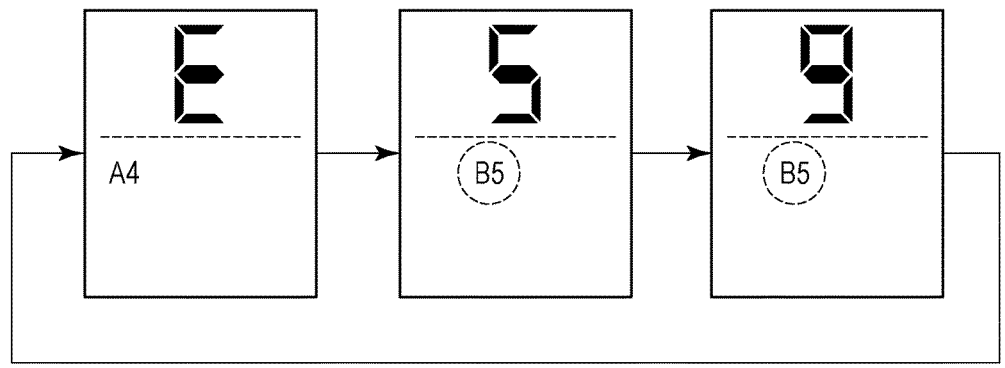
FIG. 5 is a diagram illustrating a display screen when sheet sizes do not match.

FIG. 5 illustrates a display screen when the sheet sizes do not match. At S706, display control for the display illustrated in FIG. 5 is executed. The broken-line circles in FIG. 5 indicate that the icons (the sheet size) are blinking as in FIG. 4. When the printing apparatus 100 executes a printing process, if sheet information registered in the printing apparatus 100 as the size of sheets set in the feeding unit 103 does not match a set sheet size specified for the print job, the user can be notified of the mismatch. When the sheet sizes do not match, a predetermined error number (notification information) is displayed as notification information for notifying the user of the mismatch between the sheet sizes on the seven-segment display 201 by the display being automatically updated by a toggle. FIG. 5 illustrates a display example in which the predetermined error number (notification information) is "E59". "E", "5", "9", which are part of letters or numerals included in the error number (notification information), are automatically updated in sequence and displayed repeatedly. Specifically, even if a user instruction (operation) is not given to the printing apparatus 100 when "E" which is part of the notification information is displayed, "5", which is another part of the notification information, is displayed in place of "E".

Together with the error number, lighting of the sheet size registered in the printing apparatus 100 and blinking of the sheet size specified for the job are alternately repeated on the sheet size display 202. That is, the sheet size obtained at S702 and the sheet size obtained at S703 are displayed by blinking.

As illustrated in FIG. 5, the display information including part of numerals or letters included in the error number (notification information) and the sheet size are repeatedly displayed by being automatically updated. That is, even if a user instruction (operation) is not given to the printing apparatus 100 when one display information is displayed, another display information is displayed. FIG. 5 illustrates a display example in which sheet size "A4" is obtained at S702, and sheet size "B5" is obtained at S703. As illustrated in FIG. 5, the three items of display information to be automatically updated include two items of display information "B5", which are display items on the sheet size set for the print job.

The ratio of the display information indicating "A4", which is a display item related to the sheet size set in the printing apparatus 100, and two items of display information indicating the sheet size "B5" for the print job is set to 2:1:1. Specifically, in FIG. 5, the ratio of display times of the display state at the left, the display state in the center, and the display state at the right is 2:1:1. Thus, for the sheet size, the display item "A4" and the display item "B5" are displayed for the same display time. However, automatic update may be performed so that the display time of the sheet size set in the printing apparatus 100 and one of the display times of the sheet size for the print job is longer than the other.

As illustrated in FIG. 5, the display item related to the sheet size set (registered) in the printing apparatus 100 is displayed in a lit manner, and the display item related to the sheet size set for the print job is displayed in a blinking manner. This allows the user who views the display information illustrated in FIG. 5 to determine whether the sheet size displayed is a size set in the printing apparatus 100 or a size set foe the print job. The different ways for displaying the display items are not limited to "lighting" and "blinking". Various ways of display can be employed, for example, making the blinking time different.

Only one of the two sheet sizes may not always be displayed. In the example in FIG. 5, only "A4" of "A4" and "B5" may be displayed as one display information, and both of "A4" and "B5" may be displayed as another display information. Alternatively, only "B5" may be displayed as one display information, and both of "A4" and "B5" may be displayed as another display information. As another alternative, both of "A4" and "B5" may be displayed as any display information. When both of "A4" and "B5" are displayed, only "A4" may be blinked, and "B5" may be lit as one display information, and only "B5" may be blinked, and "A4" may be lit as another display information.

Sheet sizes are displayed on the sheet size display 202 as display information to be displayed when a mismatch between the sheet sizes occurs, as described above. That is, a display common to that for the sheet size set (registered) in the printing apparatus 100 is used. This allows suitable display about the sheet size to be given to the user even if separate sheet size displays are not provided.

When the display at S706 in FIG. 7 (the display illustrated in FIG. 5) is shown, the process goes to S707. The CPU 301 executes a process when sheet sizes do not match (at a mismatch) at S707.

Figure 6:
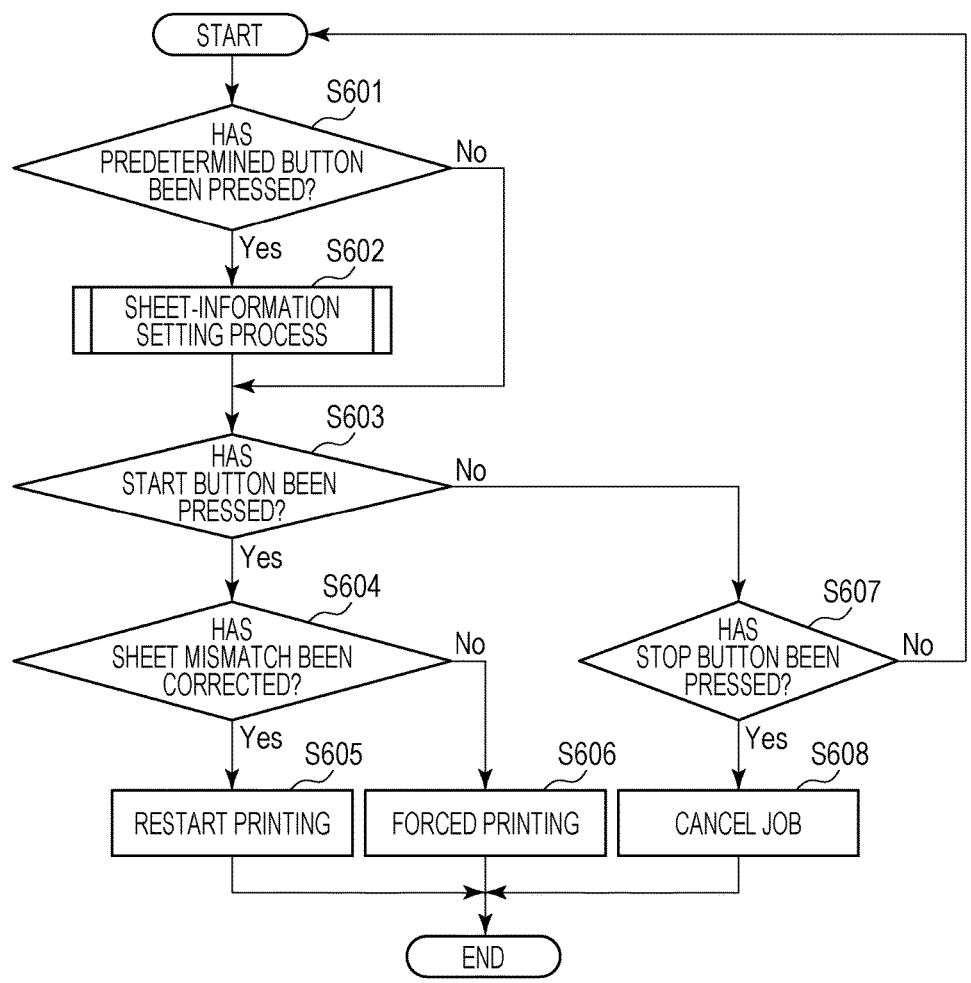
FIG. 6 is a flowchart for a process when sheet sizes do not match (at a mismatch) in the present embodiment.

FIG. 6 is a flowchart for the process when sheet sizes do not match executed at S707. In FIG. 6, the start button 204 is assigned as an error correct button, and the stop button 205 is assigned as a job cancel button.

At S601, the CPU 301 determines whether a predetermined button in the hard key group 319, different from the error correct button and the stop button, has been pressed. If it is determined that the predetermined button has been pressed, then at S602 the CPU 301 executes the sheet-information setting process illustrated in FIG. 4B. In other words, the user can perform the sheet changing operation illustrated in FIG. 4B by pressing a predetermined button in the display state illustrated in FIG. 5, allowing sheet size information registered in the printing apparatus 100 to be changed.

If pressing of the error correct button, the stop button, and the predetermined button is not detected in FIG. 6, the display illustrated in FIG. 5 is continuously executed. That is, if it is No at S601, S603, and S607 in FIG. 6, the display illustrated in FIG. 5 is executed. Alternatively after the process of S602, the display illustrated in FIG. 5 is executed.

At S601, the CPU 301 may also determine whether the present screen is a screen showing the sheet size registered in the printing apparatus 100 (in FIG. 5, the screen including "A4"). The CPU 301 may execute the process at S602 on condition that the screen is displayed. If a screen showing a set sheet size (in FIG. 5, the screen including "B5") is displayed, the process of S602 may not be executed. Thus setting up conditions for executing the process of S602 (conditions for displaying the screen illustrated in FIG. 5) allows the user to recognize more clearly that sheet size information registered in the printing apparatus 100 can be changed.

Next at S603, the CPU 301 determines whether the start button has been pressed. If at S603 it is determined that the start button has been pressed, then at S604 the CPU 301 determines whether the sheet mismatch state (sheet-size mismatch state) has been corrected. Specifically, at S604, the CPU 301 reads the sheet size registered in the printing apparatus 100 from the above storage area, as in the process of S702. The CPU 301 then compares the read sheet size and the sheet size determined at S703 to determine whether the sheet sizes match by the process similar to the process at S704.

If at S604 it is determined that the two sheet sizes match, then the CPU 301 determines that the mismatch between the sheet sizes has been resolved by the sheet information setting process in FIG. 4B and goes to the process of S605. At S605, the CPU 301 causes the printing unit to print a print image of the size corresponding to the sheet size set for the print job, as in the process of S705. If at S604 it is determined that the two sheet sizes do not match, the process goes to S606. This includes a case where the sheet size registered in the printing apparatus 100 by the sheet-information setting process illustrated in FIG. 4B has not been changed and a case where the sheet size has been changed but the mismatch with the set sheet size has not been corrected. Another case is that the user intends to execute printing with the sheet sizes remaining mismatched. At S606, the CPU 301 executes forced printing with the sheet sizes remaining mismatched.

At S606, printing is executed according to the sheet size set in the print job, as at S605. Specifically, a print image is generated according to the sheet size set in the print job, and an image of a size corresponding to the sheet size is printed. As a result, at S606, an image of a size corresponding to the sheet size set in the print job can be printed on a sheet of a size different from the sheet size. One example of the case where the user intends to execute forced printing at S606 is trial printing performed on a plain sheet of A4 size before L-size is specified as a print setting to a photo sheet of L size.

In this case, the user may intentionally specify "L-size" as a print setting even if sheet size "A4" is set in the printing apparatus 100. At that time, even if the display illustrated in FIG. 5 is given, the user may specify forced printing because it is an intentional setting.

At S606, the CPU 301 may cause the display unit 320 to give a display indicating the printing is performed under the determination that the sheet sizes do not match before or during execution of the printing. In the present embodiment, printing can be stopped by pressing the job cancel button during the printing not only at S606. Therefore, if the user, who recognizes the display at S606, does not intend to perform printing at the mismatch between sheet sizes, the user can appropriately press the job cancel button.

Thus, the display or the printing process can be changed as appropriate in the printing under the determination that the sheet sizes match (S605) and the printing under the determination that the sheet sizes do not (S606). If the processes in the two printing operations are the same, the process of S605 may be executed in response to pressing of the start button 204 without executing the determination process at S604.

If at S603 it is determined that the start button 204 has not been pressed, then at S607 the CPU 301 determines whether the stop button has been pressed. If the stop button has been pressed, the CPU 301 cancels the print job to terminate the process.

In the process illustrated in FIG. 6, the print image is kept in a printable state, and also the print setting is kept until the stop button is pressed so that the print job is cancelled by the user. Therefore, for example, when the user sets sheets of sheet information different from desired sheet information (the size or the like) set in print setting in the printing apparatus 100, the sheets can be changed to desired sheets for printing. This allows the user to execute printing on the desired sheets without the need to select a print image or set print settings again. Furthermore, since sheet information can be reregistered at S602, desired sheet information can be reflected to a matching process in the next printing.

In the above embodiment, after part (for example, "E" in FIG. 5) of the display of notification information for notifying the user that sheet information does not match is displayed, another part of the notification information (for example, "5" in FIG. 5) is displayed even if a user instruction is not given. This allows the user to grasp the above notification information without giving an instruction to switch between displays. Thus, the user is appropriately given notification information even if all items of notification information cannot be displayed at the same time on a display unit capable of displaying limited display content.

In the above description, sheet size is used as an example of a predetermined attribute of sheets whose information registered in the printing apparatus 100 and information set in the print job are compared. However, this is given for mere illustration. For example, sheet type indicating the kind of the sheet, such as the material of the sheet, (for example, a plain sheet, a glossy sheet, a mat sheet, and the like) may be used for the processes described above, instead of the sheet size.

In the above embodiment, an example in which the printing apparatus 100 includes one operation panel is described. The printing apparatus 100 may include a plurality of operation panels. In this case, a sheet size (registered sheet size) set (registered) in the printing apparatus 100 and a sheet size (set sheet size) specified in the job may not be displayed on one panel when it is determined that sheet sizes do not match. Specifically, of the registered sheet size and the set sheet size, only the registered sheet size may be displayed on a first panel of the plurality of panels, and only the set sheet size may be displayed on a second panel. Alternatively, the printing apparatus 100 may include one operation panel, and the operation panel may include only one display. In this case, all of the error number, the registered sheet size set (registered) in the printing apparatus 100, and the sheet size (set sheet size) specified in the job may be alternately repeatedly displayed on the display. Furthermore, the method for displaying the sheet size is not limited to lighting and blinking. The above configuration provides benefits of the embodiment for various configurations of the operation panel.

In the above embodiment, forced printing that is executed with sheet sizes remaining mismatched has been described. Conditions for executing the forced printing may include conditions based on the registered sheet size set (registered) in the printing apparatus 100 and the set sheet size specified in the print job. For example, if the set sheet size specified in the job is larger than the registered sheet size set (registered) in the printing apparatus 100, printing may be performed outside the print sheet, so that the print image is partly dropped out. To prevent it, if the set sheet size specified in the job is larger than the registered sheet size set (registered) in the printing apparatus 100 when mismatch between sheet sizes occurs, a print instruction by pressing the start button may not be accepted so that the printing process is not permitted. Providing such a condition ensures preventing printing that is not intended by the user.

In the above embodiment, the attribute (for example, size) of sheets set in the printing apparatus 100 is an attribute registered by the user. This is given for mere illustration. The attribute (size or the like) of sheets may be detected by a sensor that the printing apparatus 100 includes, and the detected attribute may be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-119066 filed Jun. 16, 2017, which is hereby incorporated by reference herein in its entirety.

What is claimed is:

1. A printing apparatus for printing an image, the printing apparatus comprising:
   a first acquisition unit configured to acquire first sheet information related to a predetermined attribute of a sheet set in the printing apparatus;
   a second acquisition unit configured to acquire second sheet information related to the predetermined attribute set as a print setting for printing executed by the printing apparatus; and
   a display control unit configured to cause a display unit to display notification information,
   wherein, in a case where the first sheet information and the second sheet information do not match, the display control unit causes the display unit to display notification information for notifying a user that the first sheet information acquired by the first acquisition unit and the second sheet information acquired by the second acquisition unit do not match,
   wherein the notification information is for notifying the user of a first display item related to the first sheet information and a second display item related to the second sheet information,
   wherein, when displaying the notification information, the display control unit causes the display unit to display a first part of the notification information and a predetermined display item of the first display item and the second display item, and
   wherein, even in a case where no user instruction is given in a case where the first part and the predetermined display item are displayed, the display control unit causes the display unit to display a second part of the notification information different from the first part and displays another display item of the first display item and the second display item instead of the first part and the predetermined display item.

2. The printing apparatus according to claim 1,
   wherein the display control unit causes the display unit to display the notification information by updating a letter or a numeral included in the notification information, and
   wherein, even in a case where no user instruction is given, the letter or the numeral can be displayed by the display unit.

3. The printing apparatus according to claim 2, wherein, even in a case where no user instruction is given while the other display item is displayed, the display control unit updates the letter or the numeral included in the notification information while causing the display unit to display the other display item.

4. The printing apparatus according to claim 3, wherein the display control unit causes the first display item and the second display item to be displayed for a same period of time.

5. The printing apparatus according to claim 1, wherein the display control unit uses different display methods to display the first display item and the second display item.

6. The printing apparatus according to claim 5, wherein the display control unit causes the first display item to be displayed by a lighting method, and the second display item by a blinking method.

7. The printing apparatus according to claim 1, wherein the display unit separately includes a display for displaying the notification information and a display for displaying the first display item and the second display item.

8. The printing apparatus according to claim 7, wherein the display for displaying the notification information includes seven lightable segments and represents numerals or letters included in the notification information with a combination of lit segments of the seven segments.

9. The printing apparatus according to claim 1, further comprising a register unit configured to register sheet information as the predetermined attribute of the sheet set in the printing apparatus in accordance with a user operation on the display performed by the display unit,
   wherein the first acquisition unit acquires the first sheet information based on the sheet information registered by the register unit.

10. The printing apparatus according to claim 9,
    wherein a display included in the display unit is for displaying the first display item and the second display item, and
    wherein the register unit causes the display for displaying the first display item and the second display item to execute display for registering the sheet information and registers the sheet information in accordance with a user operation for the display for registering the sheet information.

11. The printing apparatus according to claim 10, wherein the register unit causes the display for the registration to be executed in a case where a sensor detects that a sheet is set in the printing apparatus.

12. The printing apparatus according to claim 10, wherein the register unit causes the display for the registration to be executed in a case where a sensor detects a predetermined operation on a cassette for storing the sheet in the printing apparatus.

13. The printing apparatus according to claim 1, further comprising a printing unit configured to print an image to be printed on a sheet set in the printing apparatus in a case where the first sheet information acquired by the first acquisition unit and the second sheet information acquired by the second acquisition unit match.

14. The printing apparatus according to claim 13, wherein the printing unit prints the image to be printed according to a user operation on the display performed by the display control unit, even in a case where the first sheet information and the second sheet information do not match.

15. The printing apparatus according to claim 14, wherein, in a case where the first sheet information and the second sheet information do not match, the printing unit prints the image to be printed based on the second sheet information.

16. The printing apparatus according to claim 15,
    wherein the predetermined attribute is a sheet size,
    wherein the printing unit prints the image to be printed of a size corresponding to the second sheet information in a case where the first sheet information and the second sheet information do not match, and
    wherein printing of the image to be printed by the printing unit is not permitted in a case where the first sheet information and the second sheet information do not match and the size corresponding to the second sheet information is larger than a size corresponding to the first sheet information.

17. The printing apparatus according to claim 1, wherein the predetermined attribute is a sheet size.

18. The printing apparatus according to claim 1, wherein the predetermined attribute is a sheet type.

19. The printing apparatus according to claim 1, wherein the printing apparatus includes the display unit.

20. A method for controlling a printing apparatus for printing an image, the method comprising:

acquiring, as a first acquisition, first sheet information related to a predetermined attribute of a sheet set in the printing apparatus;

acquiring, as a second acquisition, second sheet information related to the predetermined attribute set as a print setting for printing executed by the printing apparatus; and causing a display unit to display notification information, wherein, in a case where the first sheet information and the second sheet information do not match, causing includes causing the display unit to display notification information for notifying a user that the first sheet information acquired by the first acquisition and the second sheet information acquired by the second acquisition do not match, wherein the notification information is for notifying the user of a first display item related to the first sheet information and a second display item related to the second sheet information, wherein, when displaying the notification information, causing includes causing the display unit to display a first part of the notification information and a predetermined display item of the first display item and the second display item, and wherein, even in a case where no user instruction is given in a case where the first part and the predetermined display item are displayed, causing includes causing the display unit to display a second part of the notification information different from the first part and displays another display item of the first display item and the second display item instead of the first part and the predetermined display item.

* * * * *